United States Patent [19]

Mizuno et al.

[11] Patent Number: 5,272,122

[45] Date of Patent: Dec. 21, 1993

[54] BAO-XTIO$_2$ DIELECTRIC CERAMIC COMPOSITION

[75] Inventors: Fumio Mizuno; Manabu Sato, both of Nagoya, Japan

[73] Assignee: NGK Spark Plug Company, Ltd., Aichi, Japan

[21] Appl. No.: 946,631

[22] Filed: Sep. 18, 1992

[30] Foreign Application Priority Data

Sep. 18, 1991 [JP] Japan .................. 3-267286

[51] Int. Cl.$^5$ .................................. C04B 35/46
[52] U.S. Cl. ............................. 501/137; 501/138
[58] Field of Search .......................... 501/137, 138

[56] References Cited

FOREIGN PATENT DOCUMENTS

| | | |
|---|---|---|
| 61-10806 | 1/1986 | Japan . |
| 61-10807 | 1/1986 | Japan . |
| 63-117957 | 5/1988 | Japan . |
| 1-37807 | 8/1989 | Japan . |

*Primary Examiner*—Mark L. Bell
*Assistant Examiner*—Deborah Jones
*Attorney, Agent, or Firm*—Finnegan, Henderson, Farabow, Garrett & Dunner

[57] ABSTRACT

Disclosed is a BaO-xTiO$_2$ dielectric ceramic composition (x=3.5 to 4.5) containing BaTi$_4$O$_9$ and Ba$_2$Ti$_9$O$_{20}$, wherein the content ratio of Ba$_2$Ti$_9$O$_{20}$ {Ba$_2$Ti$_9$O$_{20}$/(BaTi$_4$O$_9$+Ba$_2$Ti$_9$O$_{20}$)} obtained by a X-ray diffraction maximum peak height integration method described below is less than 0.19, content ratio of Ba$_2$Ti$_9$O$_{20}$={a peak height ascribed to the (421) face of Ba$_2$Ti$_9$O$_{20}$+a peak height ascribed to the (222) face thereof}/[{a peak height ascribed to the (200, 140) face of BaTi$_4$O$_9$+a peak height ascribed to the (121) face thereof+a peak height ascribed to the (230, 150) face thereof} + {a peak height ascribed to the (421) face of Ba$_2$Ti$_9$O$_{20}$+a peak height ascribed to the (222) face thereof}].

In the above dielectric ceramic composition, it is possible to prevent the occurrence of hexagonal pattern cracks and hence to improve the yield.

4 Claims, 7 Drawing Sheets

BAO-XTIO$_2$ DIELECTRIC CERAMIC COMPOSITION

BACKGROUND OF THE INVENTION

1. Field of the Invention

The present invention relates to a BaO-xTiO$_2$ dielectric ceramic composition, and more particularly, to a BaO-xTiO$_2$ dielectric ceramic composition having a Ba$_2$Ti$_9$O$_{20}$/(BaTi$_4$O$_9$+Ba$_2$Ti$_9$O$_{20}$) ratio of less than 0.19 for preventing the occurrence of hexagonal pattern cracks.

The present invention is applicable for impedance matching or the like in a dielectric resonator (particularly, one with a large size of 50 mm$\phi$ or more), a microwave integrated circuit board or impedance matching in various microwave circuits in a microwave region.

2. The Related Art of the Invention

There have been known various BaO-xTiO$_2$ dielectric ceramic compositions, for example, disclosed in Japanese Patent Publication No. hei 1-37807, Japanese Patent Laid-open No. sho 61-10806, Japanese Patent Laid-open No. sho 61-10807, Japanese Patent Laid-open No. sho 63-117957 and the like.

However, the conventional dielectric ceramic compositions described above have a disadvantage of causing hexagonal pattern cracks on the surface of the resonator in a baking process thereby significantly reducing the yield. In particular, the large size resonator has such a tendency to cause the above cracks.

SUMMARY OF THE INVENTION

To solve the above problem, the present invention has been made, an object of which is to provide a BaO-xTiO$_2$ dielectric ceramic composition capable of preventing hexagonal pattern cracks while achieving the practical characteristics.

The present applicants have examined the mechanism for the occurrence of the hexagonal pattern cracks in the BaO-xTiO$_2$ dielectric ceramic composition, and consequently have found the fact that there is a correlation between the content ratio of Ba$_2$Ti$_9$O$_{20}$ and the occurrence of the cracks.

Namely, in a preferred mode of the present invention, there is provided a BaO-xTiO$_2$ dielectric ceramic composition containing BaTi$_4$O$_9$ and Ba$_2$Ti$_9$O$_{20}$ (X=3.5 to 4.5), wherein the content ratio of Ba$_2$Ti$_9$O$_{20}$ {Ba$_2$Ti$_9$O$_{20}$/(BaTi$_4$O$_9$+Ba$_2$Ti$_9$O$_{20}$)} obtained by a X-ray diffraction maximum peak height integration method is less than 0.19.

The following five specified peak values are used in the above X-ray diffraction maximum peak height integration method: the first and second peak values respectively ascribed to the (421) face and (222) face of Ba$_2$Ti$_9$O$_{20}$; the third, fourth and fifth peak values respectively ascribed to the (200, 140) face, the (121) face, and the (230, 150) face of BaTi$_4$O$_9$. Thus, each maximum peak height is obtained, and thereby the content ratio of Ba$_2$Ti$_9$O$_{20}$ {Ba$_2$Ti$_9$O$_{20}$/(BaTi$_4$O$_9$+Ba$_2$Ti$_9$O$_{20}$)} is calculated.

In addition, the value of [0.19] appearing in the wording [the content ratio of Ba$_2$Ti$_9$O$_{20}$ is less than 0.19] means the value obtained by the X-ray diffraction maximum peak height integration method. Accordingly, even using the same sample, in the case of obtaining the content ratio of Ba$_2$Ti$_9$O$_{20}$ by another method of, for example, integrating the area of the specified peak, the value of [0.19], that is, the boundary value is changeable to a different value depending on the method.

When the variable "x" is less than 3.5, the temperature coefficient of the resonance frequency (hereinafter, referred to as $\tau_f$) is 50 ppm/°C. or more. When the variable "x" is more than 4.5, $\tau_f$ tends to approach the value of 0 but the unloaded Q (hereinafter, referred to as Qu) is reduced. Accordingly, either case is unfavorable in practical use. Also, when the content ratio of Ba$_2$Ti$_9$O$_{20}$ is not less than 0.19, unfavorably, there occur the hexagonal pattern cracks.

Also, the composition of the present invention may contain at least one of 5 to 20 pts. wt. of ZnO and 0.5 to 1 pts. wt. of Ta$_2$O$_5$ relative to 100 pts. wt. of BaO and TiO$_2$. It is well known that the addition of ZnO shifts the value of $\tau_f$ to the negative side while reducing the relative dielectric constant (hereinafter, referred to as $\epsilon_r$). However, when the content of ZnO is less than 5 pts. wt., the above function is small and thus the value of $\tau_f$ is made larger. Meanwhile, when the content of ZnO is more than 20 pts. wt., conversely, the value of $\tau_f$ is made excessively small in the negative side. Also, the addition of Ta$_2$O$_5$ is effective to improve the Qu value. When the content of Ta$_2$O$_5$ is less than 0.5 pts. wt., the Qu value is almost similar to the case of no addition, whereas when being more than 0.5 pts. wt., the Qu value is preferably increased 1.3 to 1.4 times as much as the case of no-addition. Also, in excess of 1 pts. wt., the additional effect is saturated. In addition, by the suitable addition of both the components, it is possible to balance the values of $\epsilon_r$, Qu, and $\tau_f$.

The ceramic composition of the present invention may be manufactured by the steps of mixing specified starting materials at respective specified amounts and sintering the mixture. For example, a powder to be transformed into BaO after sintering and a TiO$_2$ powder in respective amounts corresponding to the desired composition are mixed, calcined and pulverized. The pulverized powder thus obtained is further mixed with a ZnO powder, a Ta$_2$O$_5$ powder and the like in respective amounts corresponding to the desired composition, as required, and then calcined and pulverized. The resultant calcined powder is formed in a specified shape, and then baked.

In the dielectric ceramic composition of the present invention, it is possible to prevent the occurrence of hexagonal pattern cracks and hence to improve the yield.

Also, the composition of the present invention which may contain at least one kind of 5 to 20 pts. wt. of ZnO and 0.5 to 1 pts. wt. of Ta$_2$O$_5$ relative to 100 pts. wt. of BaO and TiO$_2$, is excellent in the performances of $\epsilon_r$, Qu, and $\tau_f$, and has practical and balanced performance.

Further, even in a large size dielectric ceramic body having an outside diameter of 50 mm$\phi$ or more, there occur no cracks. Therefore, the dielectric ceramic body may be utilized as large size dielectric resonator and may be practical and excellent in quality and strength.

DETAILED DESCRIPTION OF THE PREFERRED EMBODIMENTS

Hereinafter, an embodiment of the present invention will be described in detail with reference to the accompanying drawings. The present invention will be more clearly understood with reference to the following example:

EXAMPLE (1) Preparation of Sample

Powders of $BaCO_3$ and $TiO_2$ of 99.9% purity were weighed and mixed in specified amounts corresponding to each composition of [($BaO-xTiO_2$), X; 3.8, 3.5, 4.1, 4.4]. After that, the mixture was primarily pulverized and mixed in dry by a mixer, and then calcined at 1100° C. in air for 2 hrs. and pulverized, to thus manufacture the first calcined powder. Further, in the case of further addition of powders of $ZnO$, $Ta_2O_5$, $MnO_2$ and $WO_3$, as required, the $ZnO$ powder and the like were added to the first calcined powder, and then mixed and calcined in the same manner as described above, to thus manufacture the second calcined powder. In addition, each added amount of $ZnO$, $Ta_2O_5$, $MnO_2$ and $WO_3$ is represented as weight (pts. wt.) to the whole $BaO-xTiO_2$ (100 pts. wt.). The addition compositions are shown in Tables 1 to 3. Table 1 shows such compositions that "x" is 3.8 and $ZnO$ and $Ta_2O_5$ are not contained. Table 2 shows such compositions that "x" is 3.5, 4.2 and 4.4, and $ZnO$ and $Ta_2O_5$ are not contained. Table 3 shows such compositions that "x" is 3.8 and $ZnO$ and/or $Ta_2O_5$, and further $MnO_2$ or $WO_3$ are contained.

TABLE 1

BaO—3.8TiO₂ dielectric ceramic composition

| No | sample (resonator) shape | baking condition | observed portion | crack occurrence state | content ratio of $Ba_2Ti_9O_{20}$ |
|---|---|---|---|---|---|
| 1 | 200 mmφ 100 mmH | 1230° C. × 15 hr temperature rise 15° C./hr | surface | hexagonal pattern crack | 0.30 |
| 2 | 50 mmφ 20 mmH | *1) 1 hr/charge | surface | OK | 0.15 |
| 3 | | 1230° C. × 15 hr 15° C./hr | surface | hexagonal | 0.24 |
| 4 | 100 mmφ 40 mmH | 1230° C. × 15 hr temperature rise 15° C./hr | surface | hexagonal pattern crack OK | 0.31 |
| 5 | | | | | 0.16 |
| 6 | 200 mmφ 100 mmH | 1170° C. × 8 hr temperature rise 15° C./hr | surface | hexagonal pattern crack | 0.19 |
| 7 | | | surface | hexagonal pattern crack | 0.22 |
| 8 | 200 mmφ 100 mmH | *2) 2 hrs/charge | surface | OK | 0.14 |
| 9 | 200 mmφ 100 mmH | *2) 4 hrs/charge | surface | hexagonal pattern crack | 0.20 |
| 10 | 200 mmφ 100 mmH | 1230° C. × 7 hr temperature rise 26.4° C. | surface | OK | 0.18 |

*1) maximum temperature of heat treatment in tunnel furnace is 1200° C.
*2) maximum temperature of heat treatment in tunnel furnace is 1230° C.

TABLE 2

BaO—xTiO₂ dielectric ceramic composition

| No | x | sample shape | baking condition | observed portion | crack occurrence state | content ratio of $Ba_2Ti_9O_{20}$ |
|---|---|---|---|---|---|---|
| 11 | 3.5 | 200 mmφ 100 mmH | 1330° C. × 15 hr temperature rise 15° C./hr | surface | hexagonal pattern crack | 0.28 |
| 12 | | 200 mmφ 100 mmH | 1330° C. × 15 hr temperature rise 17.5° C./hr | surface | absence | 0.14 |
| 13 | 4.2 | 200 mmφ 100 mmH | 1240° C. × 8 hr temperature rise 15° C./hr | surface | hexagonal pattern crack | 0.38 |
| 14 | | 200 mmφ 100 mmH | 1240° C. × 8 hr temperature rise 17.5° C./hr | surface | absence | 0.10 |
| 15 | 4.4 | 200 mmφ 100 mmH | 1220° C. × 10 hr temperature rise 20° C./hr | surface | hexagonal pattern crack | 0.42 |
| 16 | | 200 mmφ 100 mmH | 1220° C. × 10 hr temperature rise 25° C./hr | surface | absence | 0.12 |

TABLE 3

BaO—3.8TiO$_2$ dielectric ceramic composition

| No | assistant | sample shape | baking condition | observed portion | crack occurrence state | content ratio of Ba$_2$Ti$_9$O$_{20}$ |
|---|---|---|---|---|---|---|
| 17 | ZnO 6 wt. pts. | 200 mmφ 100 mmH | 1250° C. × 4 hr temperature rise 20° C./hr | surface | absence | 0.14 |
| 18 | ZnO 15 wt. pts. | 200 mmφ 100 mmH | 1250° C. × 4 hr temperature rise 20° C./hr | surface | absence | 0.18 |
| 19 | Ta$_2$O$_5$ 0.5 wt. pts. | 200 mmφ 100 mmH | 1270° C. × 4 hr temperature rise 20° C./hr | surface | absence | 0.16 |
| 20 | Ta$_2$O$_5$ 1 wt. pts. | 200 mmφ 100 mmH | 1270° C. × 4 hr temperature rise 20° C./hr | surface | absence | 0.17 |
| 21 | ZnO 6 wt. pts. Ta$_2$O$_5$ 0.5 wt. pts. | 200 mmφ 100 mmH 200 mmφ 100 mmH | 1250° C. × 4 hr temperature rise 20° C./hr 1230° C. × 6 hr temperature rise 25° C./hr | surface surface | absence absence | 0.15 0.14 |
| 22 | MnO$_2$ 0.2 wt. pts. | 200 mmφ 100 mmH | 1230° C. × 7 hr temperature rise 26.4° C./hr | surface | absence | 0.15 |
| 23 | WO$_3$ 0.5 wt. pts. | 200 mmφ 100 mmH | 1230° C. × 6 hr temperature rise 25° C./hr | surface | absence | 0.15 |
| 24 | MnO$_2$ 0.2 wt. pts. WO$_3$ 0.2 wt. pts. | 200 mmφ 100 mmH | 1230° C. × 7 hr temperature rise 26.4° C./hr | surface | absence | 0.15 |
| 25 | ZnO 20 wt. pts. | 200 mmφ 100 mmH | 1250° C. × 4 hr temperature rise 20° C./hr | surface | absence | 0.18 |

The above first or second calcined powder was combined with an organic binder in a suitable amount and an ion exchange water (260 to 500 g), being secondarily pulverized using alumina balls of 20 mm φ, and then pelletized by spraying and drying. Subsequently, the pelletized powder was formed at a pressure of 1000 kg/cm$^2$ into a cylindrical shape having the size corresponding to the diameter (outside diameter) and the height shown in each Table after baking (incidentally, the inside diameter is changeable within the range of 10 to 60 mm φ).

Next, the compact thus obtained was baked in air under the condition shown in each of Tables 1 to 3, and finally ground in the size shown in each Table, to thus form each of sample Nos. 1 to 25. In addition, Tables 1, 2 and 3 show the results in the case that "x" of (BaO-xTiO$_2$) are [3.8], [3.5, 4.2 and 4.4] and [3.8], respectively. Further, in Table 3, ZnO, Ta$_2$O$_5$, MnO$_2$ or WO$_3$ is added.

(2) Performance Estimation

In each sample, the state of causing cracks on the surface was observed by an optical microscope and a scanning electron microscope. Further, the surfaces (upper surface and barrel surface) were subjected to X-ray diffractometry, and thus the content ratio of Ba$_2$Ti$_9$O$_{20}$ {Ba$_2$Ti$_9$O$_{20}$/(BaTi$_4$O$_9$+Ba$_2$Ti$_9$O$_{20}$)} was obtained by a maximum peak height integration method. Each intensity of the X-ray diffraction was measured at room temperature under the condition that a time constant was 0.5 sec. and the rotational speed of a goniometer was 2θ=1°/mim using a CuKα ray which was generated at a tube voltage of 50 KV and a tube current of 80 mA and was made to pass through a slit of 1°, 1° and 0.15 mm and a Ni foil filter. In this case, as described above, with respect to Ba$_2$Ti$_9$O$_{20}$, the peak intensities respectively ascribed to the (421) face and the (222) face were represented by the maximum peak heights from the background. Also, with respect to BaTi$_4$O$_9$, the peak intensities respectively ascribed to the (200, 140) face, (121) face and the (230, 150) face were represented by the maximum peak heights from the background.

Thus, the content ratio of Ba$_2$Ti$_9$O$_{20}$ was obtained by the following equation:

Content of
$$Ba_2Ti_9O_{20} = (I_{(421)} + I_{(222)})/(I_{(421)} + I_{(222)} + I_{(200,140)} + I_{(121)} + I_{(230,150)})$$

Figure 1:
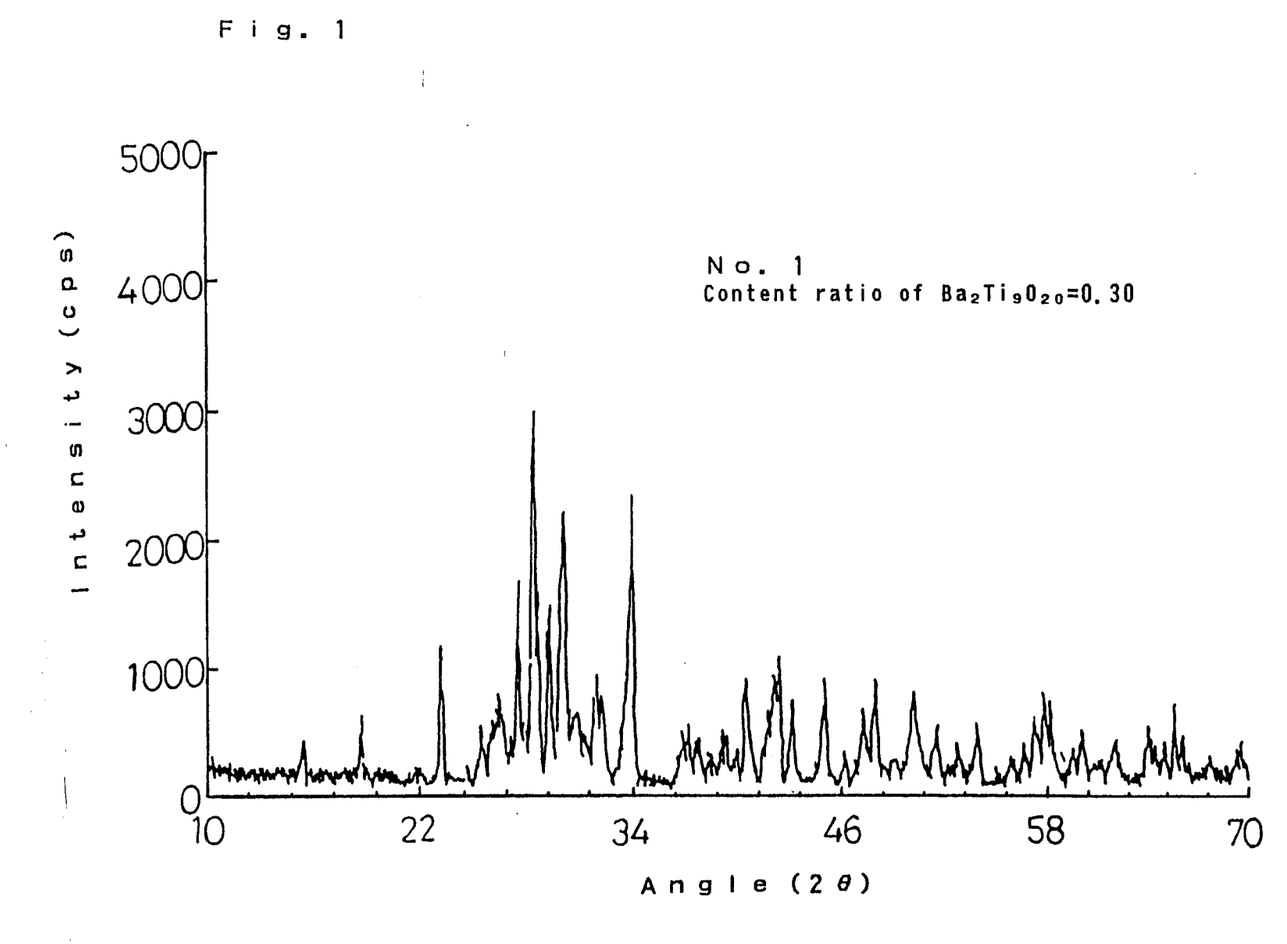
FIG. 1 is a graph showing the result of X-ray diffraction on the surface of a sample No. 1 in Example.
Figure 2:
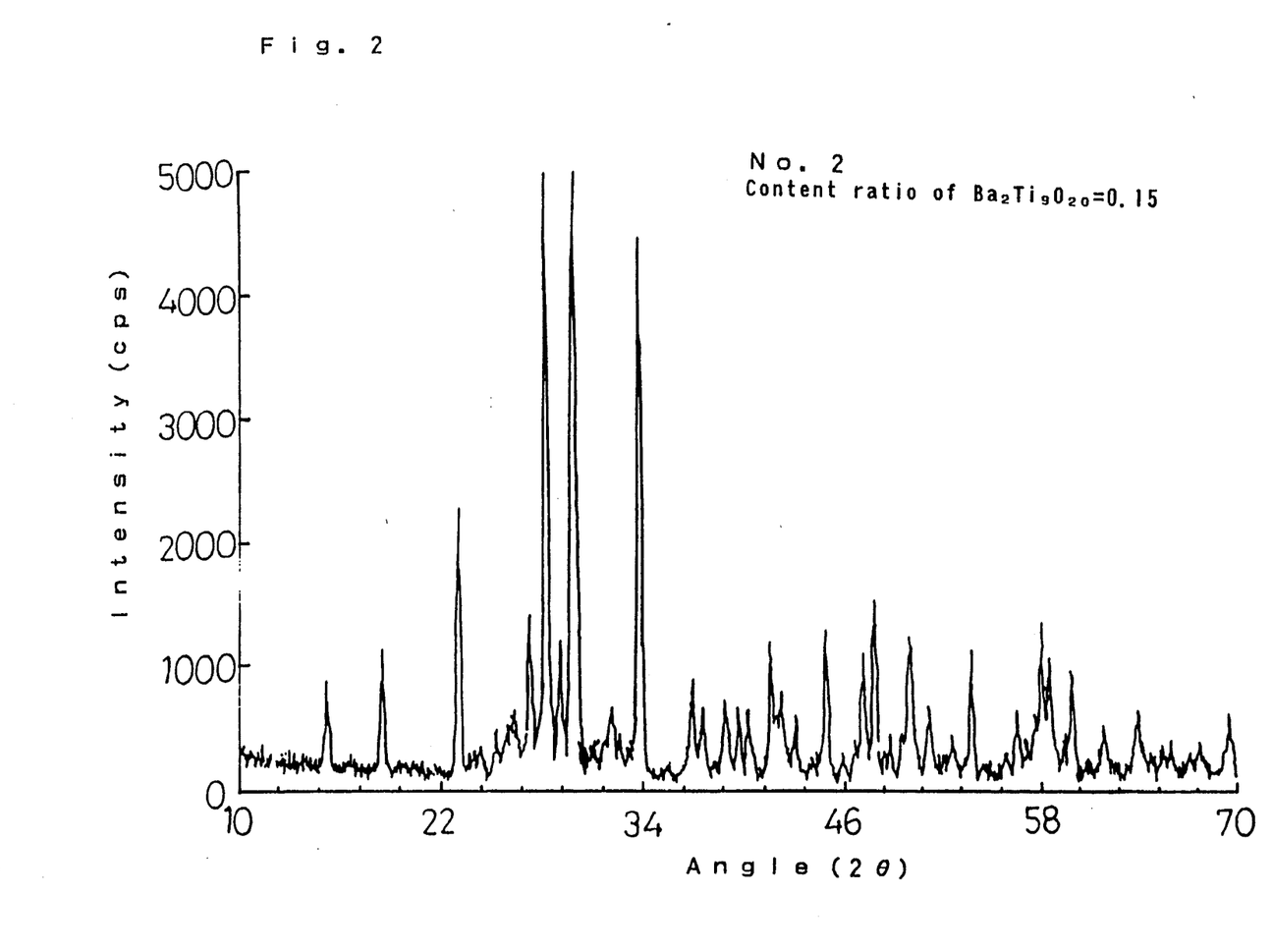
FIG. 2 is a graph showing the result of X-ray diffraction on the surface of a sample No. 2 in Example.
Figure 3:
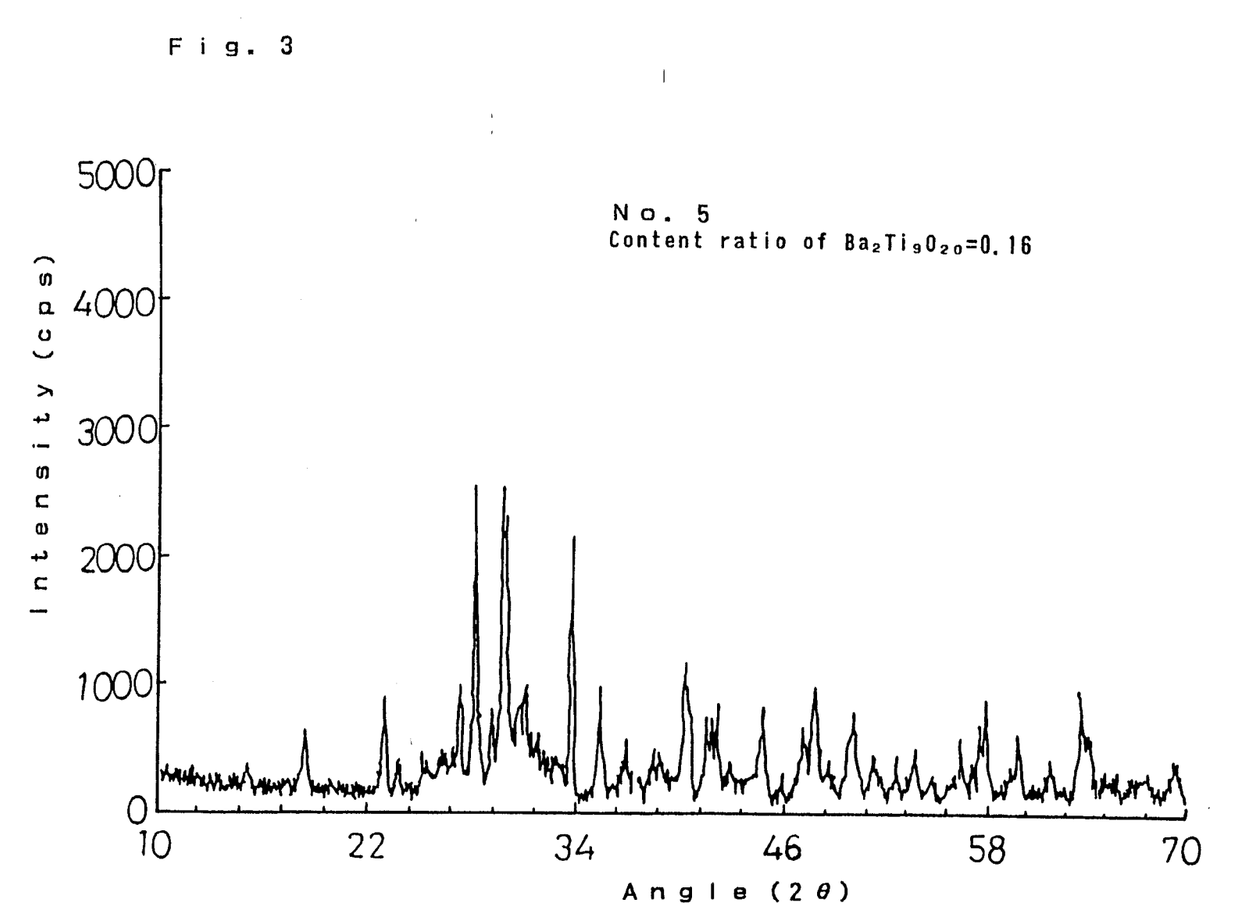
FIG. 3 is a graph showing the result of X-ray diffraction on the surface of a sample No. 5 in Example.
Figure 4:
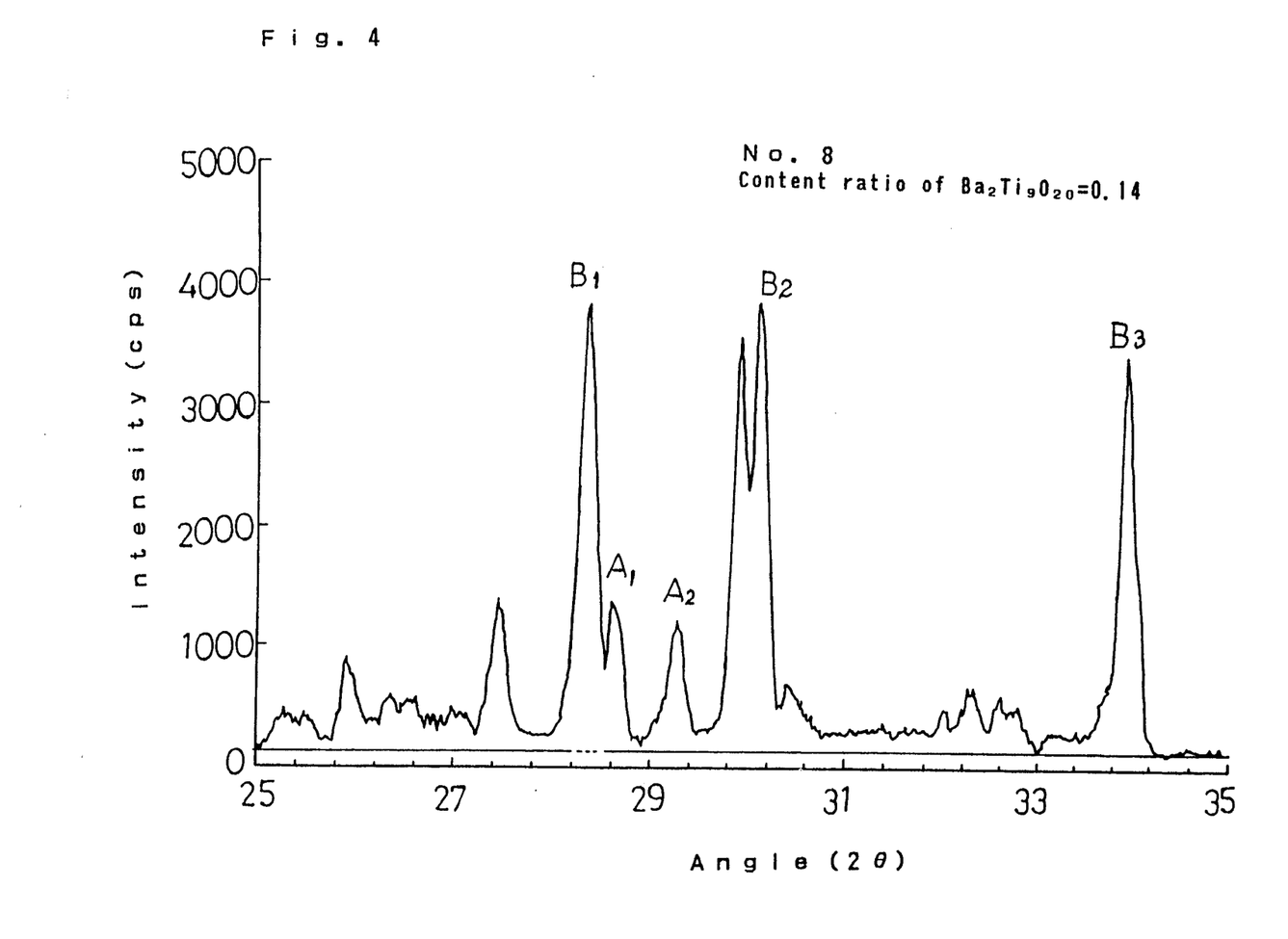
FIG. 4 is a graph showing the result of X-ray diffraction on the surface of a sample No. 8 in Example.
Figure 5:
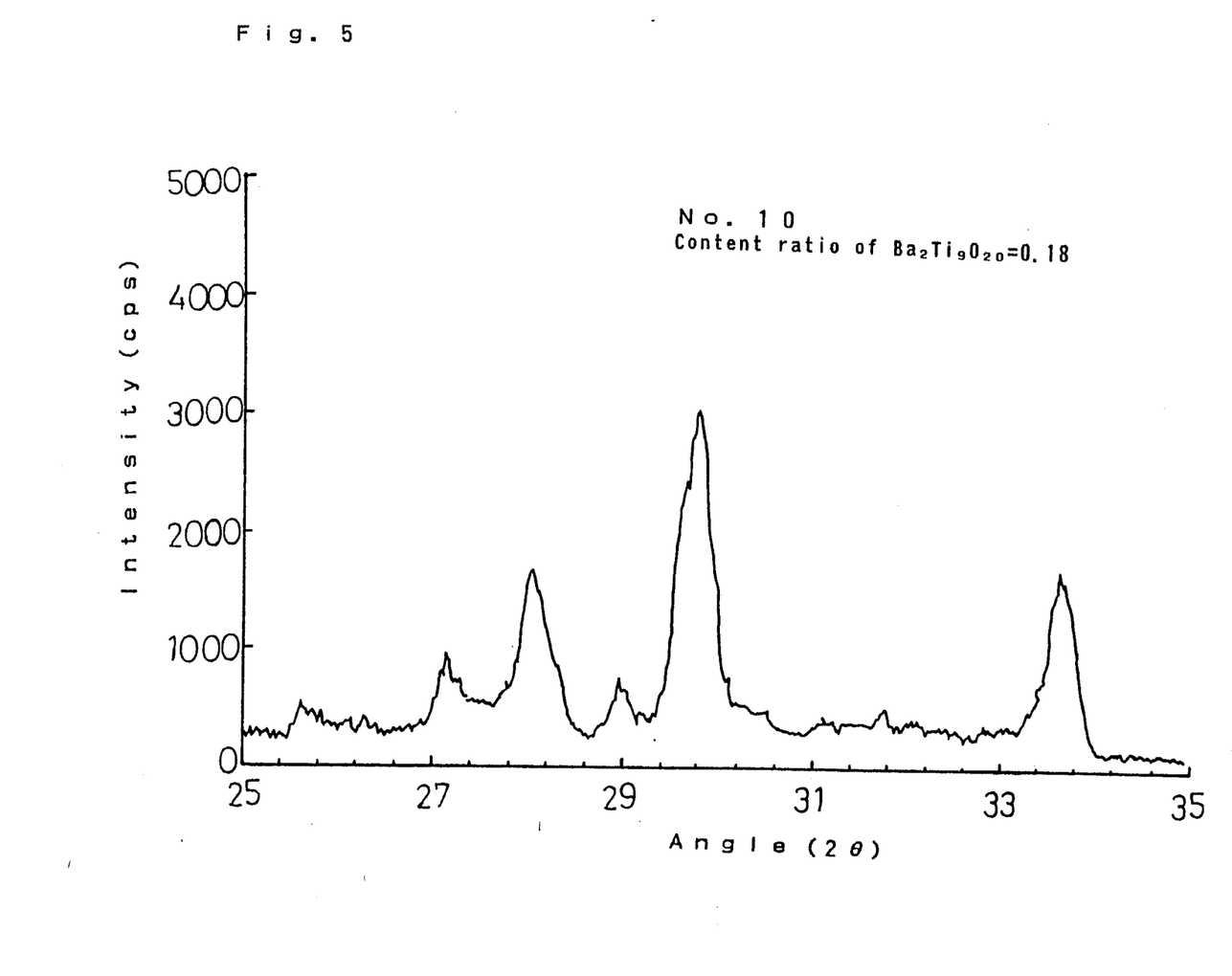
FIG. 5 is a graph showing the result of X-ray diffraction on the surface of a sample No. 10 in Example.
Figure 6:
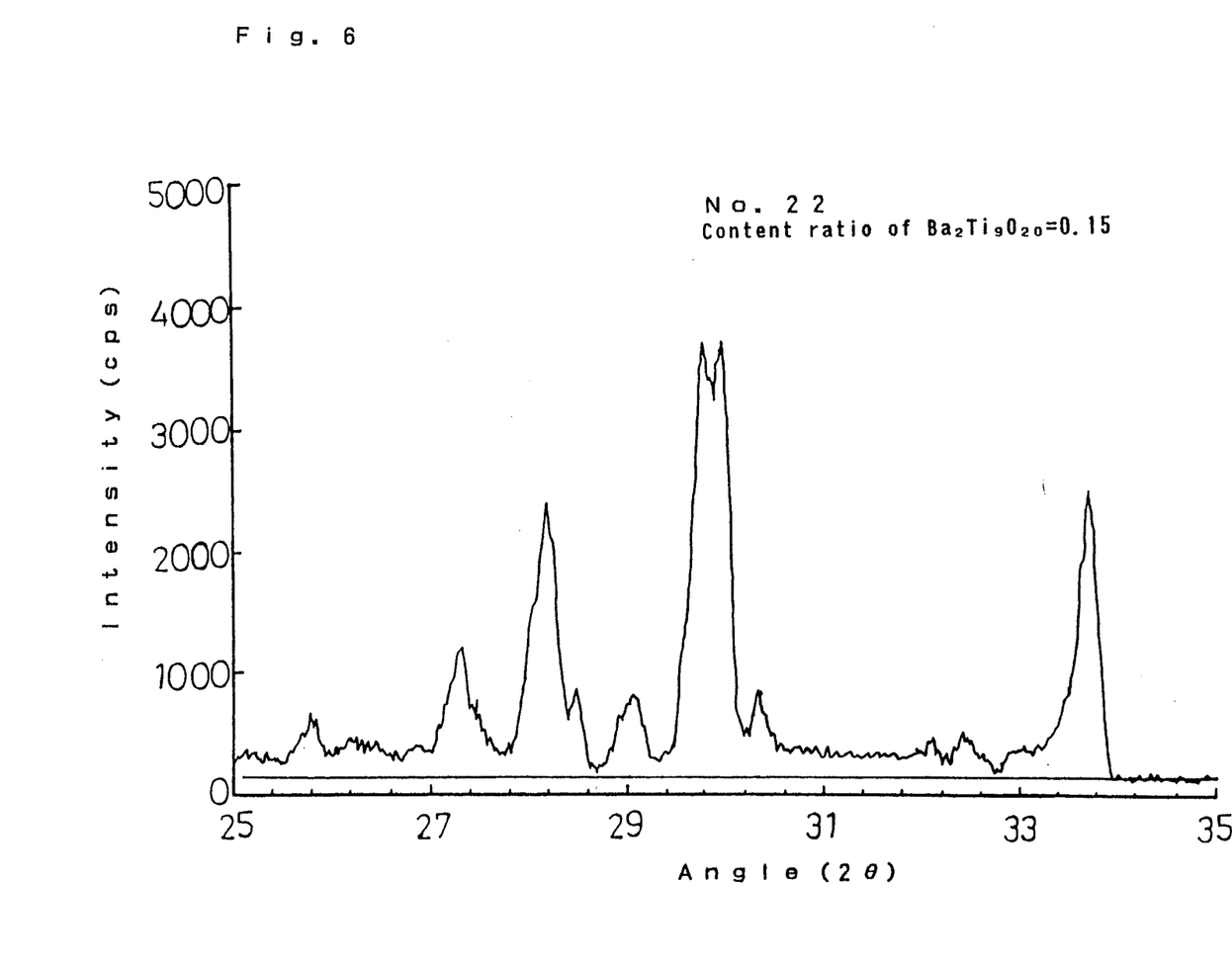
FIG. 6 is a graph showing the result of X-ray diffraction on the surface of a sample No. 22 in Example.
Figure 7:
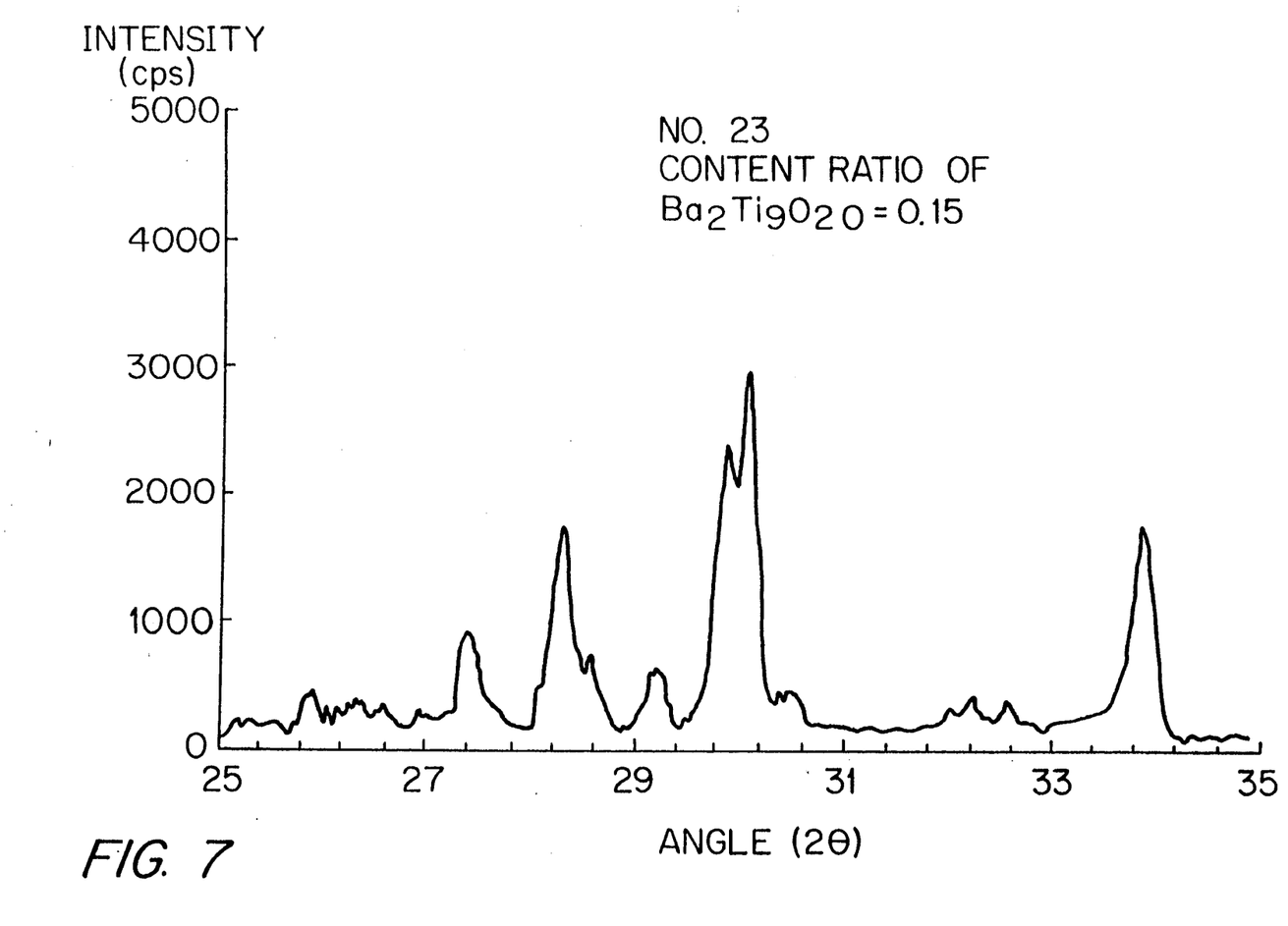
FIG. 7 is a graph showing the result of X-ray diffraction on the surface of a sample No. 23 in Example.

The calculation of the above content ratio on the basis of, for example, the result shown in FIG. 4 is as follows: content ratio of Ba$_2$Ti$_9$O$_{20}$ = (A1 peak height + A2 peak height)/(A1 peak height + A2 peak height + B1 peak height + B2 peak height + B3 peak height). These calculated results are shown in Tables 1 to 3. Also, the graphs showing the results of X-ray diffraction on the sample Nos. 1, 2, 5, 8, 10, 22 and 23 are shown in FIGS. 1, 2, 3, 4, 5, 6 and 7, respectively.

TABLE 4

Characteristics of BaO—xTiO$_2$ dielectric ceramic composition

| No | sintered density (g/cm$^3$) | relative dielectric constant ε r | Q$_u$ value (4.5 GHz) | temperature coefficient of resonance frequency τ f (ppm/°C.) |
|---|---|---|---|---|
| 2 | 4.692 | 34.5 | 4100 | 0 |
| 12 | 4.609 | 39.2 | 3060 | +16.2 |
| 17 | 4.682 | 36.0 | 3100 | +6.0 |
| 18 | 4.694 | 33.8 | 3200 | 0 |
| 20 | 4.690 | 38.5 | 4000 | +18.0 |
| 21 | 4.658 | 35.8 | 3250 | +6.8 |
| 22 | 4.698 | 34.6 | 4100 | 0 |
| 23 | 4.690 | 34.5 | 4300 | 0 |
| 24 | 4.608 | 34.5 | 4300 | 0 |
| 25 | 4.703 | 33.0 | 3000 | −8.4 |

Further, in each sample shown in Table 4, the sintered density was measured by an Archimedes' method, and also the values of ε$_r$, Qu, and τ$_f$ are measured by a parallel conductive plate type dielectric cylinder resonator method (TE$_{011}$ mode). The results are shown in Table 4. In addition, the resonance frequency lies near 4.5 GHz.

As a result, there occur hexagonal pattern cracks for the content ratio of Ba$_2$Ti$_9$O$_{20}$ not less than 0.19; but there occurs no hexagonal pattern crack for that less than 0.19. Even in a cylindrical sample having an outside diameter of 50 mm φ or more, particularly, of 200 mm φ, there occur no cracks. In the terms of this point, the ceramic composition of the present invention is highly excellent in quality as compared with the conventional one. Also, even in the larger size ceramic composition having an outside diameter of 280 mm $\phi$ and a height of 130 to 140 mm, there occurs no crack.

In addition, as shown in Table 1, $Ba_2Ti_9O_{20}$ is a high temperature stable phase as compared with $BaTi_4O_9$, and thus tends to be excessively baked. Consequently $Ba_2Ti_9O_{20}$ is increased which promotes the tendency of causing the hexagonal pattern cracks. Also, it is considered that the occurrence ratio of $Ba_2Ti_9O_{20}$ is related to the heat quantity in high temperatures including not only the baking temperature (maximum value) and holding time but also the temperature rising speed.

Further, as shown in Table 4, each sample is excellent in the balance of the performances. Particularly, the following samples are preferable: ZnO (Nos. 17, 18 and 25); $Ta_2O_5$ (No. 20); ZnO and $Ta_2O_5$ in suitable amounts respectively (No. 21); $MnO_2$ (No. 22), $WO_3$ (No. 23); and $MnO_2$ and $WO_3$ (No. 24) in a suitable amount. Also, each of the sample Nos. 22, 23 and 24 has the large sintered density, and is excellent in degree of sintering. Further, by addition of ZnO, it is possible to freely adjust the $\tau_f$, particularly, to be a small value near 0.

The above samples are practical because they do not crack and they are excellent in the practical performances.

In addition, the present invention is not limited to the above example; but may be variously modified according to the objects and applications within the scope of the present invention. Namely, the baking temperature, baking time, temperature rising speed and the like may be variously modified. Also, the starting material for producing BaO may include peroxide, hydroxide and nitrate and the like other than the above $BaCO_3$.

Further, by use of a sintering assistant (for example, at least one kind of $MnO_2$, $WO_3$, $ZrO_2$, $SnO_2$ and the like), it is possible to improve the degree of sintering while keeping the above dielectric ceramic characteristics and preventing the occurrence of cracks.

What is claimed is:

1. A $BaO$-$xTiO_2$ dielectric ceramic composition wherein $x=3.5$ to 4.5, comprising $BaTi_4O_9$ and $Ba_2Ti_9O_{20}$, wherein the content ratio of $Ba_2Ti_9O_{20}$ {$Ba_2Ti_9O_{20}/(BaTi_4O_9+Ba_2Ti_9O_{20})$} obtained by an X-ray diffraction maximum peak height integration method is less than 0.19, wherein said X-ray diffraction maximum peak height integration method provides that the content ratio of $Ba_2Ti_9O_{20}=$ {a peak height ascribed to the (421) face of $Ba_2Ti_9O_{20}+$a peak height ascribed to the (222) face thereof}/a total of {a peak height ascribed to the (200, 140) face of $BaTi_4O_9+$a peak height ascribed to the (121) face thereof+a peak height ascribed to the (230, 150) face thereof}+{a peak height ascribed to the (421) face of $Ba_2Ti_9O_{20}+$a peak height ascribed to the (222) face thereof}.

2. A $BaO$-$xTiO_2$ dielectric ceramic composition according to claim 1, wherein the content ratio of said $Ba_2Ti_9O_{20}$ is 0.10 to 0.18, the dielectric constant is 34.5 to 39.0, the Qu value at 4.5 GHz is 3200 to 4100, and the temperature coefficient of the resonance frequency is 0 to +10 ppm/°C.

3. A $BaO$-$xTiO_2$ dielectric ceramic composition wherein $x=3.5$ to 4.5, comprising $BaTi_4O_9$ and $Ba_2Ti_9O_{20}$ and at least one of ZnO and $Ta_2O_5$, wherein the content ratio of $Ba_2Ti_9O_{20}$ {$Ba_2Ti_9O_{20}/(BaTi_4O_9+Ba_2Ti_9O_{20})$} obtained by the X-ray diffraction maximum peak height integration method according to claim 1 is less than 0.19, and the content of said ZnO is 5 to 20 pts. wt. or the content of said $Ta_2O_5$ is 0.5 to 1 pts. wt. relative to the 100 pts. wt. of BaO and $TiO_2$.

4. A $BaO$-$xTiO_2$ dielectric ceramic composition according to claim 3, wherein the content ratio of said $Ba_2Ti_9O_{20}$ is 0.10 to 0.18, the dielectric constant is 33.8 to 38.5, the Qu value at 4.5 GHz is 3100 to 4000, and the temperature coefficient of the resonance frequency is −9 to +10 ppm/°C.

* * * * *